(12) United States Patent
Mitera et al.

(10) Patent No.: US 7,156,215 B2
(45) Date of Patent: Jan. 2, 2007

(54) QUICK CHANGE SHOCK ABSORBER

(75) Inventors: Richard T. Mitera, Canton, MI (US); Robert Heideman, Westland, MI (US); Ronald F. Legawiec, East Syracuse, NY (US)

(73) Assignee: Enertrols, Inc., Westland, MI (US)

( * ) Notice: Subject to any disclaimer, the term of this patent is extended or adjusted under 35 U.S.C. 154(b) by 341 days.

(21) Appl. No.: 10/684,734

(22) Filed: Oct. 14, 2003

(65) Prior Publication Data

US 2005/0077132 A1 Apr. 14, 2005

(51) Int. Cl.
*F16F 9/00* (2006.01)
(52) U.S. Cl. .............................. 188/321.11; 267/64.11; 425/450.1
(58) Field of Classification Search ............. 267/64.11, 267/119, 130, 137, 113, 139, 124; 188/321.11; 425/450.1–45.5, 538, 541, 537, 526, 534, 425/533; 248/161, 344.19
See application file for complete search history.

(56) References Cited

U.S. PATENT DOCUMENTS

| | | | | |
|---|---|---|---|---|
| 4,020,929 A | * | 5/1977 | Goldin | 188/321.11 |
| 4,298,373 A | | 11/1981 | Mumford et al. | |
| 4,694,939 A | | 9/1987 | Heideman et al. | |
| 4,801,260 A | | 1/1989 | Oles et al. | |
| 4,886,443 A | * | 12/1989 | Klinedinst et al. | 425/537 |
| 4,969,619 A | | 11/1990 | Bauer et al. | |
| 5,080,574 A | * | 1/1992 | Koga et al. | 425/526 |
| 5,306,564 A | * | 4/1994 | Guzikowski | 425/408 |
| 5,403,131 A | * | 4/1995 | Susnjara | 409/131 |
| 5,681,520 A | | 10/1997 | Koda et al. | |
| 6,371,460 B1 | | 4/2002 | Orihara | |

FOREIGN PATENT DOCUMENTS

DE 12 01 189 B 9/1965

* cited by examiner

*Primary Examiner*—Douglas C. Butler
(74) *Attorney, Agent, or Firm*—Young & Basile, P.C.

(57) ABSTRACT

A quick change shock absorber for providing for the quick and easy removal of a shock absorber from a fixture of an industrial machine. The quick change shock absorber provides a housing having a smooth, outer bore and a blind bore adaptable to hold a fluid. A piston is slidably disposed within the bore of the housing and is engageable with a driver for movement between an extended position, wherein the piston has a portion extending outwardly from the housing, and a retracted position, wherein the piston is disposed within the housing. The outer periphery is receivable by the fixture which has a bore for complementarily receiving the outer periphery of the housing. A rubber retaining ring seated within a recess of the housing of the shock absorber creates a level of friction between the outer periphery of the housing and the fixture that constitutes a snug fit for quick change removal and replacement of the housing from the fixture.

23 Claims, 4 Drawing Sheets

QUICK CHANGE SHOCK ABSORBER

FIELD OF THE INVENTION

The present invention relates to a shock absorber, and more particularly, a quick change shock absorber that utilizes a unique housing design to provide for the quick removal and replacement of the shock absorber.

BACKGROUND OF THE INVENTION

Shock absorbers or linear decelerators are often used on industrial equipment that requires the shock absorber or linear decelerator to cycle at very high rates. For instance, in the blow molding industry, plastic bottles are made by placing heated cylindrical blanks into a mold and inserting pressurized air into the blanks to stretch the mold radially to form to the mold. While the pressurization of the blank is occurring, a striker is inserted into the blank to engage the bottom of the blank and stretch the blank vertically. Shock absorbers or linear decelerators are utilized to cushion the impact of the vertical strikers. These blow molding machines may produce up to 20,000 to 40,000 bottles per hour, and therefore, the cycling rates of the striker and the wear on the shock absorbers is great. Such cycling and wear typically requires that the shock absorbers be replaced or maintained on a regular basis.

Previous designs have mounted the shock absorber 11 in a manner which makes maintaining the shock absorber 11 difficult. As seen in FIG. 1, the shock absorber 11 has a housing 13 with a piston rod 15 extending therefrom. The housing 15 of the shock absorber 11 has threads on its outer periphery and is threaded into a threaded bore 17 of a mount 19 of an industrial machine. The threaded bore 17 has a stepped diameter which forms a shoulder 21 in the mount 19. The shock absorber housing 13 is threaded into the bore 17 such that the end of the housing 13 abuts the shoulder 21 of the mount 19, and the piston rod 15 extends outwardly from the housing 13. A lock screw 23 is threaded into a threaded aperture 25 extending from the side of the mount 19 at an angle substantially perpendicular to the longitudinal axis of the shock absorber 11. The lock screw 23 engages the outer threads of the housing 13 of the shock absorber 11 in order to retain the shock absorber 11 in a predetermined position.

When the shock absorber 11 requires maintenance, the mount 19 is removed from a fixture 25 of an industrial machine, such as a blow molding machine (not shown). The lock screw 23 is unthreaded from engagement of the housing 13 of the shock absorber 11 so that the housing 13 may be unthreaded from the mount 19. Maintenance may then be performed on the shock absorber 11, and the shock absorber 11 may be threaded back into the mount 19. However, the lock screw 23 often damages the threads of the shock absorber housing 13 thereby making it difficult to thread the shock absorber housing 13 out of and into the mount 19. In some instances, the shock absorber housing 13 may not thread all the way into the bore of the mount 19 such that the shock absorber housing 13 does not engage the shoulder 21 of the mount 19. This may occur without the mechanic realizing that the shock absorber housing 13 is not threaded all the way into the bore. If this occurs and the shock absorber 11 and the mount 19 are placed back into the fixture 25, the piston rod 15 will not be in its proper position, thereby affecting the stroke length of the shock absorber 11. This, in turn, may affect the operation of the machine. Such shortcomings create an increase in the maintenance frequency of the shock absorbers 11 thereby creating an inefficiency that is undesirable in an industrial environment.

It is desirable to provide a quick change shock absorber that allows for the quick and easy maintenance of a high-cycling shock absorber while ensuring for the accuracy of the set up of the shock absorber.

SUMMARY OF THE INVENTION

The present invention relates to a quick change shock absorber for allowing the efficient removal and maintenance of the shock absorber in a fixture of an industrial machine. The quick change shock absorber provides a housing having a smooth, outer periphery and a blind bore adaptable to hold fluid. A piston is slidably disposed within the bore of the housing and is engageable with a driver for movement between an extended position, wherein said piston has a portion extending outwardly from the housing, and a retracted position, wherein the piston is disposed within the housing. The outer periphery is receivable by a fixture having a bore for complementarily receiving the outer periphery of the housing. The engagement between the outer periphery of the housing and the fixture creates a friction which constitutes a snug fit for quick change removal of the housing from the fixture.

The outer periphery of the housing provides a two step diameter which complementarily engages a two step diameter of the fixture. The larger diameter of the housing provides a recess formed therein for receiving a flexible retaining ring. The flexible retaining ring provides a friction fit with the fixture so as to constitute a snug fit.

The piston disposed within the housing provides a piston rod having a first end slidably disposed within the housing. A piston head retainer is connected to the first end of the piston rod and has an aperture extending therethrough. A piston head is coaxially aligned with the piston rod and is captured between the piston head retainer and a shoulder of the piston rod for movement between the retracted position and the extended position. The piston head engages the shoulder of the piston rod when the piston rod is moving toward the retracted position to allow fluid to flow through the aperture in the piston head retainer and around the periphery of the piston head retainer. The piston head engages the piston head retainer when the piston rod is moving toward the extended position to limit the flow of the fluid through the aperture of the piston head retainer. A spring may be disposed within the housing between an end of the blind bore and the piston head retainer for biasing the piston rod toward the extended position.

BRIEF DESCRIPTION OF THE DRAWINGS

The description herein makes reference to the accompanying drawings wherein like referenced numerals refer to like parts throughout several views and wherein.

DETAILED DESCRIPTION OF THE PRESENT INVENTION

Figure 1:
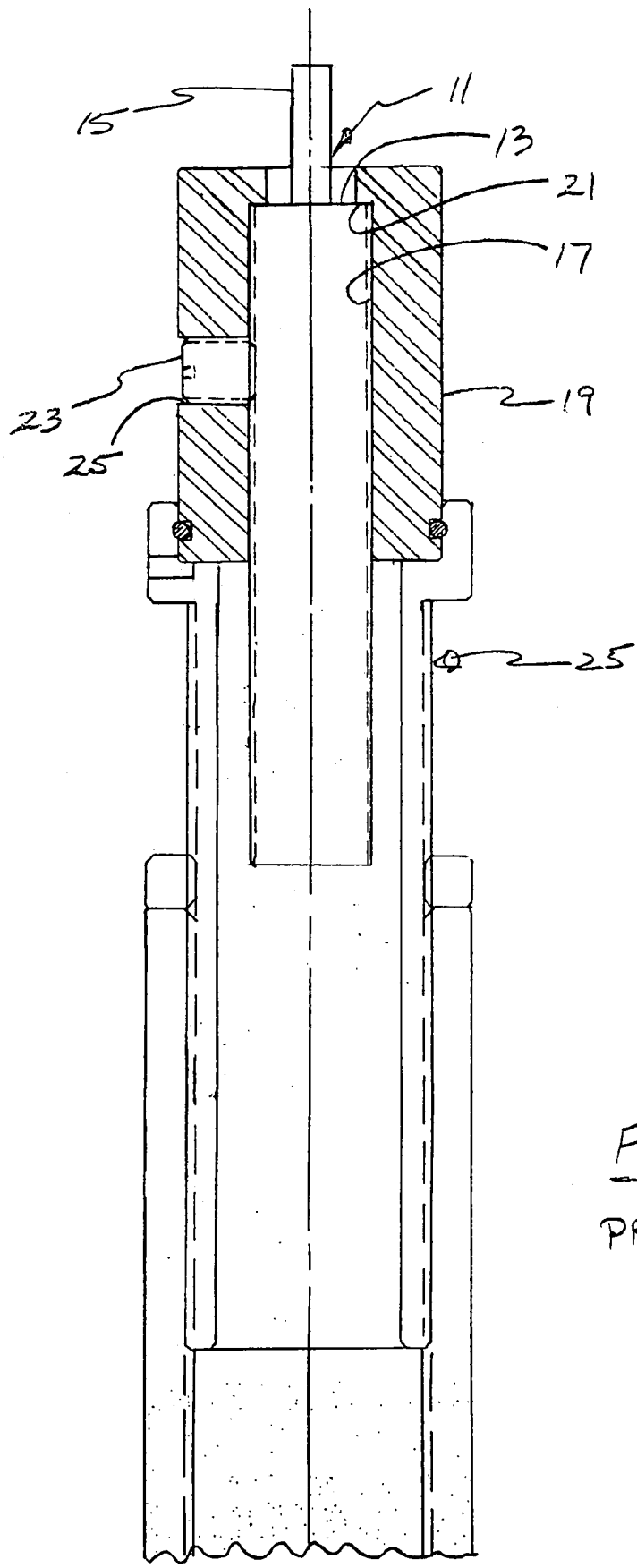
FIG. 1 is a sectional view of a prior art shock absorber.

Referring to the drawings, the present invention will now be described in detail with reference to the preferred embodiment.

Figure 2:
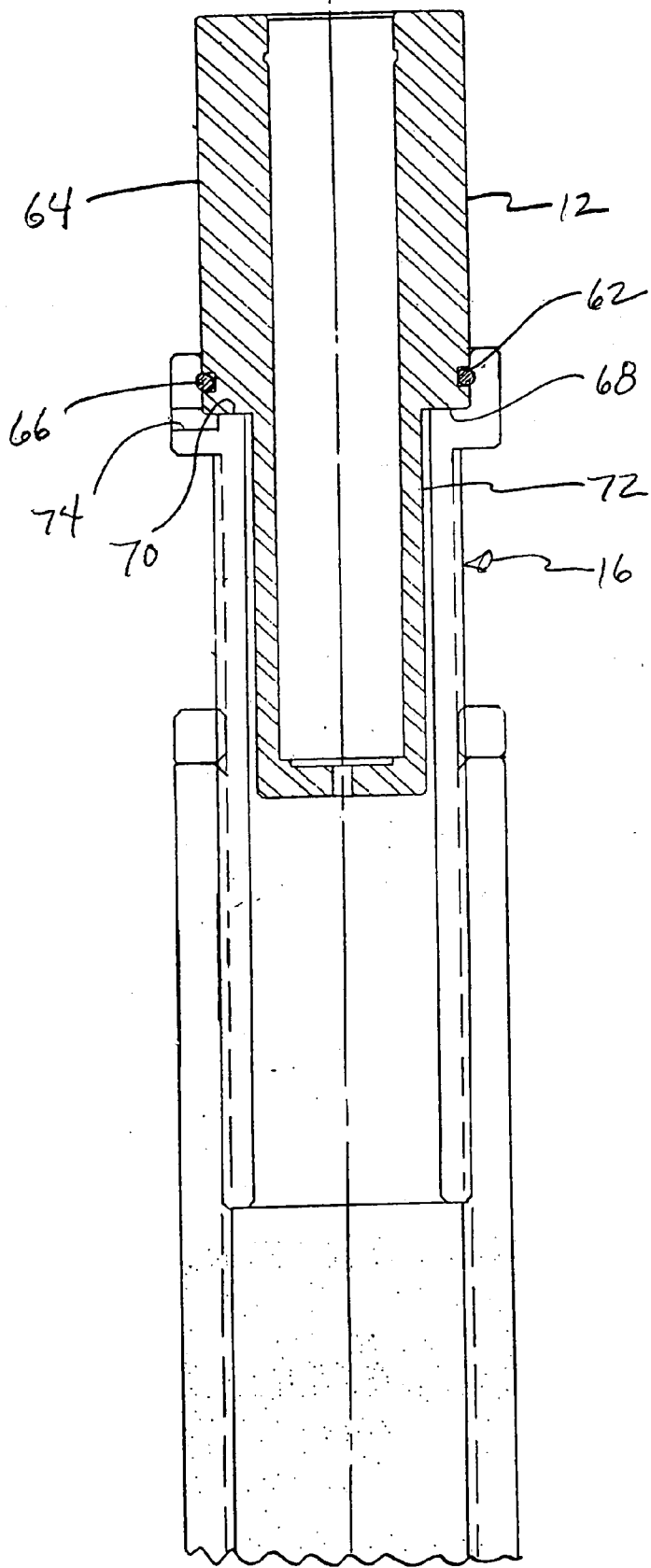
FIG. 2 is a sectional view showing the housing of the quick change shock absorber housing of the present invention disposed within a fixture.
Figure 3:
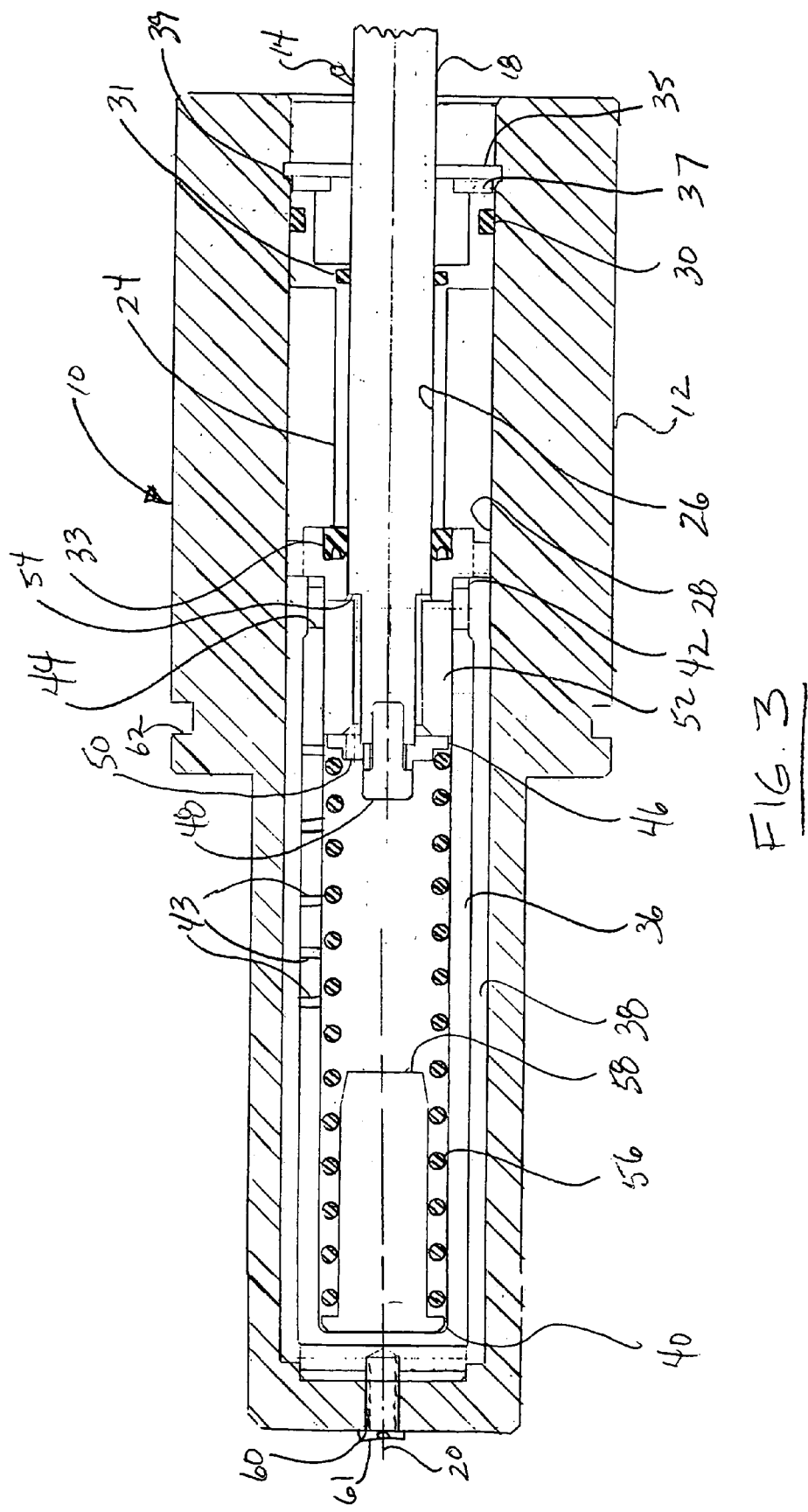
FIG. 3 is a sectional view of the quick change shock absorber of the present invention in the extended position.
Figure 4:
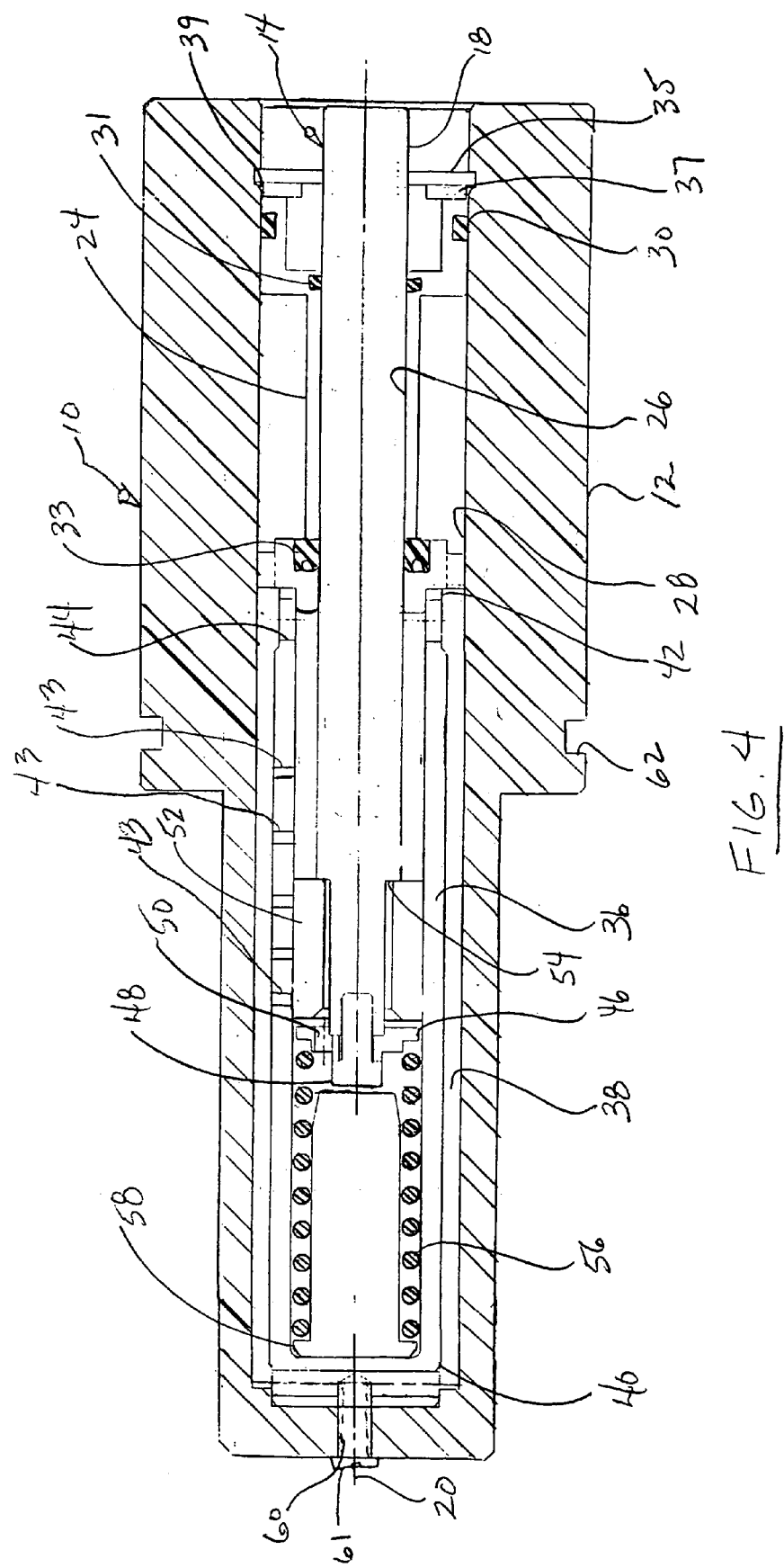
FIG. 4 is a sectional view of the quick change shock absorber of the present invention in the retracted position.

FIGS. 2–4 depict a quick change shock absorber 10 of the present invention. The quick change shock absorber 10 provides an enclosed, substantially cylindrical housing 12 having a fluid or oil disposed therein. A piston 14 is slidably disposed within the housing 12 and is engageable with a driver (not shown) for moving the piston 14 between an extended position, wherein the piston 14 has a portion extending outwardly from the housing 12 (as seen in FIG. 3), and a retracted position, wherein the piston 14 is disposed within the housing 12 (as seen in FIG. 4). The housing 12 is receivable by a fixture 16 of an industrial machine (not shown), such as a blow molding machine. Although the quick change shock absorber 10 is best suited for a blow molding machine that produces plastic bottles (not shown), the present invention is not limited to blow molding machines. In such an application, the piston 14 provides a substantially cylindrical piston rod 18 that is slidably received along a longitudinal axis 20 of the housing 12. One end of the piston rod 18 extends beyond a forward end of the housing 12 wherein the driver engages the end of the piston rod 18. The driver may comprise a striker (not shown) utilized to stretch a heated blank (not shown) in creating plastic bottles in the blow molding operation. While the striker stretches the heated blank longitudinally, pressurized air is inserted into the blank to stretch the bottle radially and form to a mold. The cycling rates of such blow molding machines increases the wear and maintenance required of shock absorbers, and therefore, the quick change shock absorber 10 of the present invention is ideal for these particular applications.

To allow the piston rod 18 to slide within the housing 12, the piston rod 18 is slidably supported along the longitudinal axis 20 of the housing 12 by a piston rod bearing 24, as seen in FIGS. 3–4. The piston rod bearing 24 is substantially cylindrical and provides a bore 26 extending therethrough for slidably receiving the piston rod 18. The outer periphery of the piston rod bearing 24 is sealed against the inner wall or bore 28 of the housing 12 by an O-ring 30. The inner periphery of the piston rod bearing 24 provides a sealed engagement against the piston rod 18 through the use of a wiper O-ring 31 and a U-cupped seal 33. The sealed engagement of the piston rod bearing 24 to the inner wall 28 of the housing 12 and to the piston rod 18 provides a sealed chamber for housing the fluid or oil. The piston rod bearing 24 is maintained within the housing 12 by a washer 35 and a snap ring 37. The snap ring 37 is seated within a recess or groove 39 provided in the inner wall or bore 28 of the housing 12.

In order to provide a fluid reservoir 38 for the proper operation of the piston 14, an elongated open-ended cylinder 36 is disposed in the rearward portion of the housing 12. The outer diameter of the cylinder 36 is smaller than the inner diameter of the bore 28 of the housing 12 such that a space is created between the adjacent walls of the cylinder 36 and the housing 12 to form the fluid reservoir 38. The cylinder 36 has a closed end 40 at the rearward end of the housing 12 and an open end 42 adjacent an end of the piston rod bearing 24. The open end 42 of the cylinder 36 overlaps and abuts the end of the piston rod bearing 24. A plurality of ports 43 are provided at longitudinally spaced locations along the side walls of the cylinder 36. The ports 43 are exponentially spaced to provide a relatively constant, resistive force when moving from the extended position to the retracted position. The position of the ports 43 may be rearranged in predetermined positions to provide various dampening characteristics. An aperture 44 is also provided in the wall of the cylinder 36 at the open end 42 of the cylinder 36 to allow for the flow of fluid or oil between the reservoir 38 and the interior portion of the cylinder 36.

To provide the dampening characteristics of the quick change shock absorber 10, a rearward end of the piston rod 18 is disposed within the cylinder 36. A piston head retainer 46 is connected to the rearward end of the piston rod 18 through the use of a fastener 48. The piston head retainer 46 is substantially cylindrical and has a three step diameter. The largest diameter of the piston head retainer 46 is slightly smaller than the inner diameter of the cylinder 36 such that fluid or oil can flow between the piston head retainer 46 and the cylinder 36. An aperture 50 substantially parallel to the longitudinal axis 20 of the housing 12 is provided through the piston head retainer 46 to allow for fluid or oil to flow through the piston head retainer 46.

In order to vary the dampening force when moving toward the retracted position as opposed to moving toward the extended position, a piston head 52 is captured between the piston head retainer 46 and a shoulder 54 of the piston rod 18. The piston head 52 is a substantially cylindrical member coaxially aligned with the longitudinal axis 20 of the housing 12. The inner diameter of the piston head 52 is somewhat larger than the outer diameter of the piston rod 18 thereby creating a space between the piston head 52 and the piston rod 18 such that fluid or oil can flow between the piston head 52 and the piston rod 18. The outer diameter of the piston head 52 is slightly smaller than the inside diameter of the cylinder 36 so as to provide a close slip fit tolerance between adjacent surfaces such that the migration of fluid between the cylinder 36 and the piston head 52 is minimized, and the fluid or oil flows between the piston head 52 and the piston rod 18.

The length of the piston head 52 is somewhat shorter than the distance between the piston head retainer 46 and the shoulder 54 of the piston rod 18. This allows the piston head 52 to shift and abut the piston head retainer 46 when moving toward the extended position and shift and abut the shoulder 54 of the piston rod 18 when moving toward the retracted position. When the piston rod 18 is moving toward the extended position, the piston head 52 abuts the piston head retainer 46, and fluid or oil flows through the aperture 50 of the piston head retainer 46 and between the piston head 52 and the piston rod 18. In addition, fluid or oil is allowed to flow from the reservoir 38 through the ports 43 to the internal portion of the cylinder 36 as the piston rod 18 continues to move toward the furthest extended position. When the piston rod 18 moves toward the retracted position, the piston head 52 engages the shoulder 54 of the piston rod 18 such that fluid is allowed to flow around the piston head, retainer 46 as well as through the aperture 50 provided in the piston head retainer 46. Fluid or oil also flows through the ports 43 to the reservoir 38. The ports 43 are continuously blocked as the piston head 52 advances toward the retracted position, thereby allowing for the continued deceleration of the piston 14 at a desired dampening force. The displaced fluid or oil from the cylinder 36 is stored in reservoir 38 until piston 14 moves toward the extended position.

The piston rod 18 is biased toward the extended position by a compression spring 56. The compression spring 56 is seated on a spring support 58 which is disposed in the rearward portion of the housing 12 within the cylinder 36.

The compression spring 56 has one end seated on the end of the spring support 58, and another end engaging the piston head retainer 46. The spring support 58 has a substantially cylindrical configuration that is substantially coaxial with the longitudinal axis 20 of the housing 12.

In order to drain or resupply the quick change shock absorber 10 with fluid or oil, an aperture 60 is provided in the end of the housing 12. A fastener or plug 61 may be removably inserted into the aperture 60 to plug the aperture 60. Fluid or oil may then be inserted or drained from the housing 12 of the shock absorber 10 through aperture 60 without having to disassemble the quick change shock absorber 10.

To provide for the quick changing of the shock absorber 10 within the fixture 16, the quick change shock absorber 10 has a two step outer diameter housing 12, as seen in FIG. 2. An annular recess 62 is formed in the larger diameter 64 of the two step diameter housing 12, and a rubber retaining ring 66 is disposed within the annular recess 62. The housing 12 of the shock absorber 10 is receivable by a two step inner bore of the fixture 16. The two step inner bore of the fixture 16 receives the housing 12 such that a shoulder 68 of the housing 12 formed at the point at which the larger and smaller diameters of the housing 12 meet, abuts a corresponding shoulder 70 on the two step diameter fixture 16. The smaller diameter 72 of the housing 12 is somewhat smaller than the smaller diameter of the fixture 16. However, the larger diameter 64 of the housing 12 has a sliding fit with the larger inner diameter of the fixture 16 such that the rubber retaining ring 66 provides a level of friction between the surfaces that corresponds to a snug fit. The snug fit ensures that the shock absorber 10 remains firmly seated within the fixture 16 while still allowing a user to remove the shock absorber 10 should maintenance need to be performed on the shock absorber 10. Since the forces on the shock absorber 10 are in the vertically downward position, the shoulders 68, 70 of the housing 12 and fixture 16, respectively, engage one another so that the shock absorber 10 remains seated in the fixture 16.

In operation, the shock absorber 10 is seated in the fixture 16. If the shock absorber 10 requires maintenance or service, the user or mechanic simply pulls the shock absorber 10 from the housing 12. If the user cannot remove the shock absorber 10 from the fixture 16, then the user may insert a tool (not shown) into a slot 74 provided in the fixture 16. The slot 74 allows the user to insert the tool under the shoulder 68 of the housing 12 and then pry or lift the housing 12 upward until the housing 12 is lifted from the fixture 16. Once the shock absorber 10 is removed from the fixture 16, the user may perform whatever maintenance is necessary on the shock absorber 10. The snap ring 37 at the end of the housing 12 allows the internal mechanisms of the shock absorber 10 to be easily removed. In addition, the aperture 44 on the end of the housing 12 provides easy access for draining and supplying fluid or oil to the internal portions of the housing 12 of the shock absorber 10. Once the proper maintenance is performed on the shock absorber 10, the shock absorber 10 is inserted back into the fixture 16. The housing 12 of the shock absorber 10 is inserted downward into the fixture 16 until the shoulder 68 of the housing 12 engages the shoulder 70 of the fixture 16.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is performed under the law.

What is claimed is:

1. A quick change shock absorber, comprising:
    a housing having a smooth, outer periphery and a blind bore adaptable to hold a fluid;
    a piston slidably disposed within said bore of said housing and engageable with a driver for movement between an extended position, wherein said piston has a portion extending outwardly from said housing, and a retracted position, wherein said piston is disposed within said housing; and
    said outer periphery of said housing receivable by a fixture having a bore for complementarily receiving said outer periphery of said housing, wherein the friction between said outer periphery of said housing and said fixture constitutes a snug fit for quick change removal of said housing from said fixture.

2. The quick change shock absorber stated in claim 1, further comprising:
    said outer periphery of said housing having a two step diameter.

3. The quick change shock absorber stated in claim 1, further comprising:
    said outer periphery of said housing having a recess formed therein; and
    a flexible retaining ring housed within said recess to provide the proper friction for constituting said snug fit.

4. The quick change shock absorber stated in claim 1, wherein said piston further comprises:
    a piston rod having a first end slidably disposed within said housing;
    a piston head retainer connected to said first end of said piston rod and having an aperture extending therethrough; and
    a piston head coaxially aligned with said piston rod and captured between said piston head retainer and a shoulder of said piston rod for movement between said retracted position and said extended position.

5. The quick change shock absorber stated in claim 4, further comprising:
    a spring disposed within said housing between an end of said blind bore and said piston head retainer for biasing said piston rod toward said extended position.

6. The quick change shock absorber stated in claim 4, further comprising:
    said piston head engaging said shoulder of said piston rod when said piston rod is moving toward said retracted position to allow fluid to flow through said aperture in said piston head retainer and around the periphery of said piston head retainer; and
    said piston head engaging said piston head retainer when said piston rod is moving toward said extended position to limit the flow of said fluid through said aperture in said piston head retainer.

7. A quick change shock absorber, comprising:
    a substantially cylindrical housing having a smooth, outer periphery and a blind bore adapted to receive a fluid;
    a piston slidably disposed within said bore of said housing and engageable with a driver for movement between an extended position, wherein said piston has a portion extending outward from said housing, and a retracted position, wherein said piston is disposed within said housing;

said outer periphery of said housing having an annular recess formed therein, and a flexible retaining ring seated within said recess; and said outer periphery of said housing receivable by a fixture having a bore for complementarily receiving said outer periphery of said housing, wherein the friction between said flexible retaining ring and said fixture constitutes a snug fit for quick change removal of said housing from said fixture.

8. The quick change shock absorber stated in claim 7, further comprising:
said outer periphery of said housing and said bore of said fixture each having a two step diameter for complementarily engaging one another.

9. The quick change shock absorber stated in claim 7, further comprising:
said housing having an annular slot formed in said blind bore; and
a removable snap ring seated within said slot and abutting said piston for securing said piston within said blind bore of said housing.

10. The quick change shock absorber stated in claim 7, further comprising:
said housing having an aperture extending through a wall of said housing and communicating with said blind bore of said housing; and
a removable plug disposed within said aperture for accessing said blind bore for communicating said fluid to and from said blind bore.

11. The quick change shock absorber stated in claim 7, wherein said piston further comprises:
a piston rod having a first end slidably disposed within said housing;
a piston head retainer connected to said first end of said piston rod and having an aperture extending therethrough; and
a piston head coaxially aligned with said piston rod and captured between said piston head and a shoulder of said piston rod for movement between a retracted position, wherein said piston rod is fully withdrawn into said housing, and an extended position, wherein said piston rod is extended outwardly from said housing.

12. The quick change shock absorber stated in claim 11, further comprising:
a compression spring disposed within said housing between an end of said blind bore and said piston head retainer for biasing said piston rod to said extended position.

13. The quick change shock absorber stated in claim 11, further comprising:
a bearing member disposed within said housing for slidably supporting said piston rod.

14. The quick change shock absorber stated in claim 11, further comprising:
said piston head engaging said shoulder of said piston rod when said piston rod is moving toward said retracted position to allow fluid to flow through said aperture in said piston head retainer and around the periphery of said piston head retainer; and
said piston head engaging said piston head retainer when said piston rod is moving toward said extended position to limit the flow of said fluid through said aperture in said piston head retainer.

15. The quick change shock absorber stated in claim 7, further comprising:

an inner, substantially cylindrical wall disposed within said bore of said housing for housing a portion of said piston, and said cylindrical wall coaxially aligned with said housing for defining a fluid reservoir between said housing and said cylindrical wall; and
said cylindrical wall having at least one aperture therein for allowing said fluid to communicate between said fluid reservoir and an area within said cylindrical wall.

16. A quick change shock absorber, comprising:
a substantially cylindrical housing having a smooth, outer periphery and a blind bore adaptable to receive a fluid;
a piston slidably disposed within said bore of said housing and engageable with a driver for movement between an extended position, wherein said piston has a portion extending outward from said housing, and a retracted position, wherein said piston is disposed within said housing;
said outer periphery of said housing having a two step diameter wherein a larger diameter of said two step diameter provides an annular recess formed therein and a flexible retaining ring seated within said recess; and
said outer periphery of said housing receivable by a fixture having a two step diameter bore for complementarily receiving said outer periphery of said housing wherein the friction between said flexible retaining ring and said fixture constitutes a snug fit for quick change removal of said housing from said fixture.

17. The quick change shock absorber stated in claim 16, further comprising:
said housing having an annular slot formed in said blind bore; and
a removable snap ring seated within said slot and abutting said piston for securing said piston within said blind bore of said housing.

18. The quick change shock absorber stated in claim 16, further comprising:
said housing having an aperture extending through a wall of said housing and communicating with said blind bore of said housing; and
a removable plug disposed within said aperture for accessing said blind bore for communicating said fluid to and from said blind bore.

19. A quick change shock absorber stated in claim 16, wherein said piston further comprises:
a piston rod having a first end slidably disposed within said housing;
a piston head retainer connected to said first end of said piston rod and having an aperture extending therethrough; and
a piston head coaxially aligned with said piston rod and captured between said piston head and a shoulder of said piston rod for movement between a retracted position, wherein said piston rod is fully withdrawn within said housing, and an extended position, wherein said piston rod extends from said housing.

20. The quick change shock absorber stated in claim 19, further comprising:
a compression spring disposed within said housing between an end of said blind bore and said piston head retainer for biasing said piston rod toward said extended position.

21. The quick change shock absorber stated in claim 19, further comprising:
a bearing member disposed within said housing for slidably supporting said piston rod.

22. The quick change shock absorber stated in claim 19, further comprising:

said piston head engaging said shoulder of said piston rod when said piston rod is moving toward said retracted position to allow fluid to flow through said aperture in said piston head retainer and around a periphery of said piston head retainer;

said piston head engaging said piston head retainer when said piston rod is moving toward an extended position to limit the flow of said fluid through said aperture in said piston head retainer.

23. The quick change shock absorber stated in claim 16, further comprising:

an inner, substantially cylindrical wall disposed within said bore of said housing for housing a portion of said piston, and said cylindrical wall coaxially aligned within said housing for defining a fluid reservoir between said housing and said cylindrical wall wherein said piston is housed within said housing; and said cylindrical wall having a plurality of apertures for allowing said fluid to communicate between said fluid reservoir and from within said cylindrical wall.

* * * * *